United States Patent
Uchimoto

(10) Patent No.: US 11,355,972 B2
(45) Date of Patent: Jun. 7, 2022

(54) WIRELESS POWER RECEIVER AND ELECTRONIC DEVICE

(71) Applicant: ROHM Co., LTD., Kyoto (JP)

(72) Inventor: Daisuke Uchimoto, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 0 days.

(21) Appl. No.: 16/828,458

(22) Filed: Mar. 24, 2020

(65) Prior Publication Data

US 2020/0313470 A1 Oct. 1, 2020

(30) Foreign Application Priority Data

Mar. 29, 2019 (JP) .............................. JP2019-065945

(51) Int. Cl.
*H02J 50/90* (2016.01)
*H02J 7/02* (2016.01)
*H02J 50/80* (2016.01)
*H02J 50/12* (2016.01)

(52) U.S. Cl.
CPC ............... *H02J 50/90* (2016.02); *H02J 7/02* (2013.01); *H02J 50/12* (2016.02); *H02J 50/80* (2016.02)

(58) Field of Classification Search
CPC ............ H02J 50/12; H02J 50/80; H02J 50/90
See application file for complete search history.

(56) References Cited

U.S. PATENT DOCUMENTS

| 2015/0340878 A1* | 11/2015 | Oosumi | H02J 50/10 307/104 |
| 2016/0218520 A1* | 7/2016 | Mehas | H02J 50/60 |
| 2017/0136906 A1* | 5/2017 | Draeger | H02J 7/025 |
| 2017/0294941 A1* | 10/2017 | Long | H04B 1/30 |

FOREIGN PATENT DOCUMENTS

| JP | 5071574 B1 | 11/2012 |
| JP | 2013-38854 A | 2/2013 |
| WO | 2017/145603 A1 | 8/2017 |

* cited by examiner

*Primary Examiner* — Toan T Vu
*Assistant Examiner* — Joseph N Inge
(74) *Attorney, Agent, or Firm* — Chip Law Group

(57) ABSTRACT

A wireless power receiver receives a power signal from a wireless power transmitter, the wireless power receiver including a reception antenna including a reception coil, a rectifier circuit that rectifies a current of the reception antenna, a plurality of position detection coils provided near the reception coil or provided to overlap the reception coil, and a position detection unit that detects a positional relation between the position detection coils and a transmission coil of the wireless power transmitter based on a detection signal indicating an electrical state of the position detection coils. An electronic device includes the wireless power receiver. Another electronic device includes a wireless power receiver that receives a power signal from a wireless power transmitter and that can detect a position of a transmission coil of the wireless power transmitter, and a notification unit that notifies a user of information based on the position of the transmission coil.

13 Claims, 8 Drawing Sheets

F I G.7
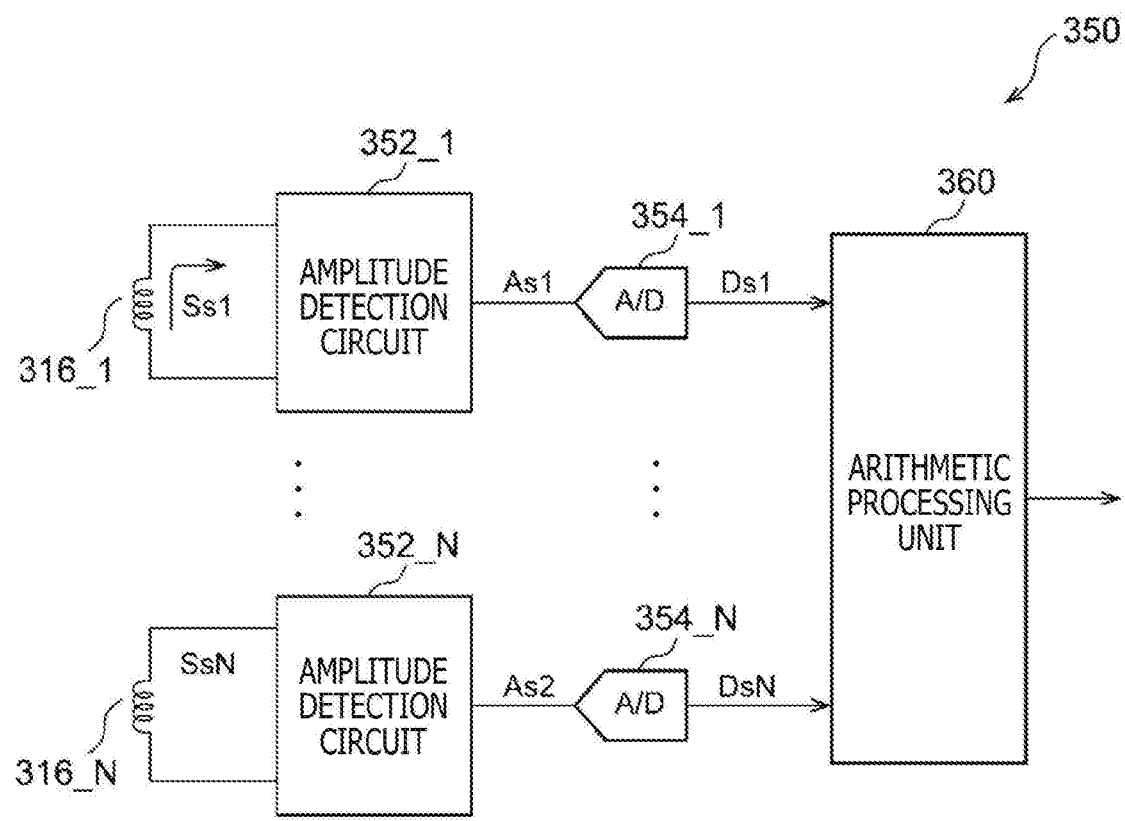

WIRELESS POWER RECEIVER AND ELECTRONIC DEVICE

CROSS REFERENCE TO RELATED APPLICATIONS

This US. Applications claims priority benefit of Japanese Patent Application No. 2019-065945 filed in the Japan Patent Office on Mar. 29, 2019. Each of the above-referenced applications is hereby incorporated herein by reference in its entirety.

BACKGROUND

The present disclosure relates to a wireless power supply technique, and particularly to position detection of a coil.

In recent years, wireless power supply has started to be widely used as a power supply system for an electronic device. There are two systems of wireless power supply, that is, a magnetic induction (MI) system and a magnetic resonance (MR) system. In the MI system, (1) a standard "Qi" established by Wireless Power Consortium (WPC) and (2) a standard (hereinafter, "PMA") established by Power Matters Alliance (PMA) are currently the mainstream.

The wireless power supply of the MI system uses magnetic induction between a transmission coil and a reception coil. A power supply system includes a power supply apparatus including the transmission coil and a power receiver including the reception coil.

FIG. 1 is a diagram illustrating a configuration of a wireless power supply system 10 compliant with the Qi standard. The power supply system 10 includes a power transmitter 20 (TX) and a power receiver 30 (RX). The power receiver 30 is mounted on an electronic device, such as a mobile phone terminal, a smartphone, an audio player, a gaming device, and a tablet terminal.

The power transmitter 20 includes a transmission coil (primary coil) 22, a driver 24, a power transmission controller 26, and a demodulator 28. The driver 24 includes an H-bridge circuit (full-bridge circuit) or a half-bridge circuit and applies a driving signal S1, specifically, a pulse signal, to the transmission coil 22. The driving current flowing through the transmission coil 22 generates a power signal S2 of an electromagnetic field in the transmission coil 22. The power transmission controller 26 comprehensively controls the entire power transmitter 20, and specifically, controls the switching frequency of the driver 24, the duty ratio of switching, the phase, and the like to change the transmission power.

The power receiver 30 includes a reception coil (secondary coil) 32, a rectifier circuit 34, a smoothing capacitor 36, a modulator 38, a load 40, a power reception controller 42, and a power supply circuit 44. The reception coil 32 receives the power signal S2 from the transmission coil 22. The rectifier circuit 34 and the smoothing capacitor 36 rectify and smooth a current S4 induced in the reception coil 32 according to the power signal S2 and convert the current S4 into a direct-current (DC) voltage.

The power supply circuit 44 uses power supplied from the power transmitter 20 to charge a secondary battery not illustrated or steps up or down a DC voltage VRECT to supply the DC voltage VRECT to the power reception controller 42 or other loads 40.

In the Qi standard, a communication protocol is established between the power transmitter 20 and the power receiver 30, and a control signal S3 can be used to transmit information from the power receiver 30 to the power transmitter 20. Backscatter modulation is used to perform amplitude modulation (AM) of the control signal S3, and the control signal S3 is transmitted from the reception coil 32 (secondary coil) to the transmission coil 22. The control signal S3 includes, for example, power control data (also referred to as "packet") for controlling the supply of power to the power receiver 30 and data indicating information specific to the power receiver 30.

The power control will be described. The power reception controller 42 of the power receiver 30 generates power control data for controlling the supply of power (transmission power) from the power transmitter 20. For example, the power reception controller 42 generates a power control packet to bring the voltage VRECT of the smoothing capacitor 36 close to a desired point (DP) of the voltage VRECT. The modulator 38 modulates the current (or voltage) of the reception coil 32 based on the power control packet. As a result, the reception coil 32 serves as a transmission antenna, and the control signal S3 is transmitted.

In the power transmitter 20, current components corresponding to the control signal S3 flow through the transmission coil 22. The demodulator 28 demodulates the control signal S3 included in the current or the voltage of the transmission coil 22. The power transmission controller 26 controls the driver 24 to obtain the transmission power instructed by the power control data included in the demodulated control signal S3.

In this way, the feedback control is performed to bring the transmission power into line with the power requested by the power receiver side in the power supply system 10 compliant with the Qi standard. The feedback control of the transmission power is similarly performed in the PMA standard.

FIG. 2 is a diagram illustrating a charger 50 and an electronic device 60. The electronic device 60 is placed on a charging stand 52 of the charger 50. The transmission coil 22 of FIG. 1 is provided below the charging stand 52 of the charger 50.

The charging efficiency is affected by a coupling coefficient (degree of coupling) of the transmission coil 22 and the reception coil 32. To increase the coupling coefficient, the electronic device 60 may need to be placed on the charging stand 52 such that the transmission coil 22 and the reception coil 32 properly overlap with each other. However, the transmission coil 22 and the reception coil 32 are both provided inside of a housing, and it is difficult to visually check the transmission coil 22 and the reception coil 32. Therefore, the charging efficiency may be reduced when the electronic device 60 is just placed without paying close attention.

Examples of patent documents include Japanese Patent Laid-Open No. 2013-38854, Japanese Patent No. 5071574, and PCT Patent Publication No. WO 2017/145603.

SUMMARY

If the electronic device 60 can detect a relative positional relation between the built-in reception coil 32 and transmission coil 22, the electronic device 60 can notify the user of the electronic device 60 that the position of the terminal is inappropriate or prompt the user to correct the position of the terminal.

The present disclosure has been made in view of the problem, and an example of an object of a mode of the present disclosure is to provide a wireless power receiver that can detect a position of a transmission coil.

A mode of the present disclosure relates to a wireless power receiver that receives a power signal from a wireless power transmitter. The wireless power receiver includes a reception antenna including a reception coil, a rectifier circuit that rectifies a current of the reception antenna, a plurality of position detection coils provided near the reception coil or provided to overlap the reception coil, and a position detection unit that detects a positional relation between the plurality of position detection coils and a transmission coil of the wireless power transmitter based on a detection signal indicating an electrical state of the plurality of position detection coils.

A current corresponding to part of a magnetic flux (magnetic field) generated by the transmission coil, the part being interlinked with each of the plurality of position detection coils, flows through each of the plurality of position detection coils. Therefore, the position of the transmission coil can be estimated based on the relative relation between the currents of the plurality of position detection coils (or coil voltages based on the currents).

The plurality of position detection coils may be provided inside of the reception coil. The position detection coils are placed not to overlap the transmission coil, and this can prevent an increase in the thickness.

The plurality of position detection coils may be provided along a winding at an innermost circumference of the reception coil. The plurality of position detection coils may be concentrated near a center of the reception coil.

The plurality of position detection coils may be provided outside of the reception coil. The position detection coils are placed not to overlap the transmission coil, and this can prevent an increase in the thickness.

The plurality of position detection coils may be provided along a winding at an outermost circumference of the reception coil.

The number of the plurality of position detection coils may be three or more. In this way, two-dimensional position information of the reception coil can be obtained.

The plurality of position detection coils may be arranged at equal distances from the center of the reception coil.

The reception coil may be a circular coil, the number of the plurality of position detection coils may be four, and the plurality of position detection coils may be evenly arranged in a circumferential direction of the reception coil. The number of the plurality of position detection coils may be four, and the plurality of position detection coils may be evenly arranged in a circumferential direction of the transmission coil. In this way, two-dimensional position information of the reception coil can be obtained.

The position detection unit may include a plurality of amplitude detection circuits corresponding to the plurality of position detection coils, each of the plurality of amplitude detection circuits being configured to detect an amplitude of the detection signal of the corresponding position detection coil.

Each of the plurality of amplitude detection circuits may include a peak hold circuit.

The position detection unit may include an arithmetic processing unit that detects a position of the transmission coil based on an output of the plurality of amplitude detection circuits.

Another mode of the present disclosure relates to an electronic device. The electronic device includes one of the wireless power receivers described above. The electronic device may further include a notification unit that notifies a user of the electronic device that a position of the electronic device is inappropriate and/or that prompts the user of the electronic device to move the position of the electronic device based on position information of the transmission coil detected by the wireless power receiver. In this way, highly efficient charging can be performed.

Another mode of the present disclosure also provides an electronic device. The electronic device includes a wireless power receiver that receives a power signal from a wireless power transmitter and that can detect a position of a transmission coil of the wireless power transmitter, and a notification unit that notifies a user of information based on the position of the transmission coil detected by the wireless power receiver.

Note that an arbitrary combination of the constituent elements and things obtained by replacing the constituent elements or the expressions of the present disclosure with each other between methods, apparatuses, systems, or the like are also effective as modes of the present disclosure.

According to a mode of the present disclosure, the position of the transmission coil can be detected.

BRIEF DESCRIPTION OF THE DRAWINGS

FIG. 7 is a circuit diagram illustrating a configuration example of a position detection unit;

DETAILED DESCRIPTION OF THE PREFERRED EMBODIMENT

Figure 1:
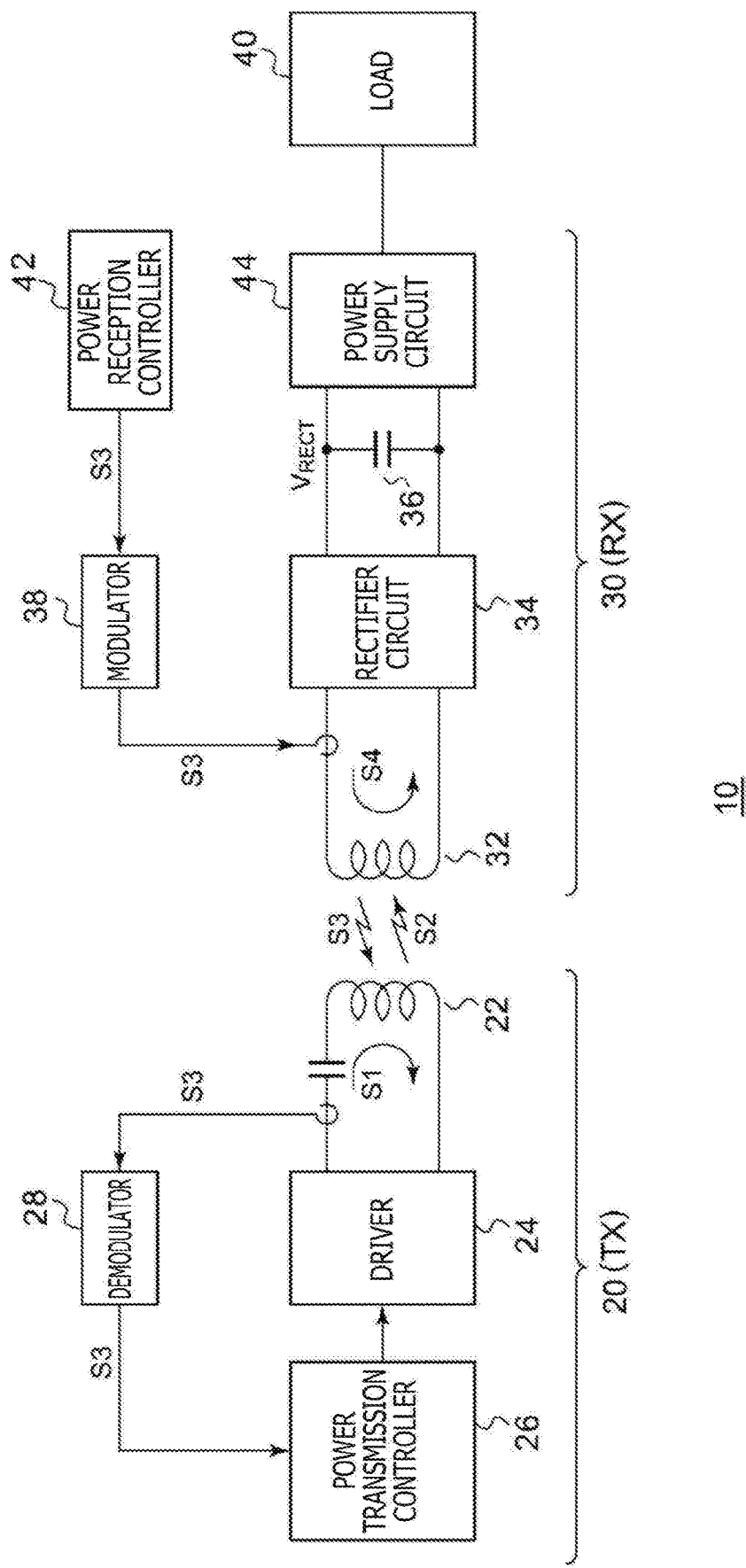
FIG. 1 is a diagram illustrating a configuration of a wireless power supply system compliant with a Qi standard.
Figure 2:
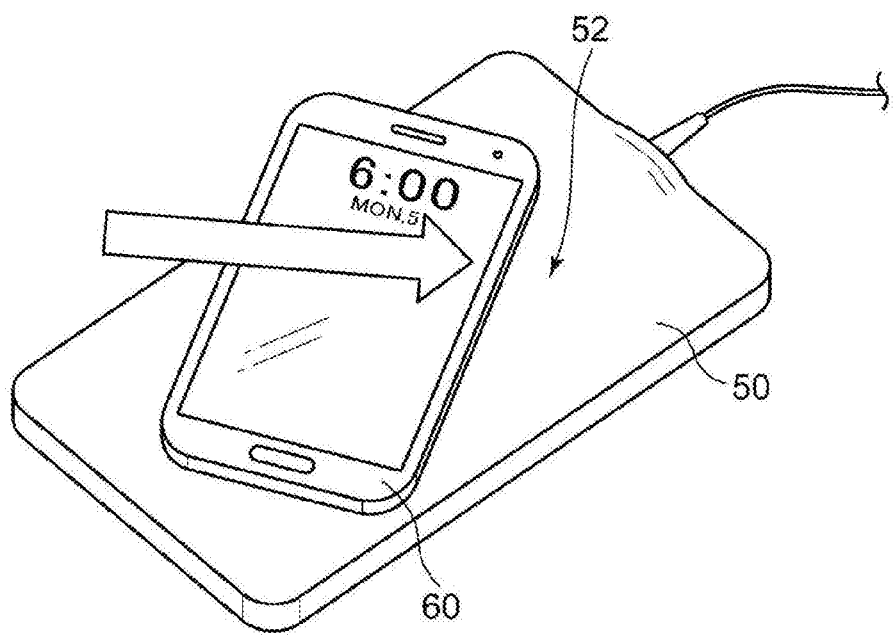
FIG. 2 is a diagram illustrating a charger and an electronic device.

The present disclosure will now be described based on a preferred embodiment with reference to the drawings. The same reference symbols are provided to the same or equivalent constituent elements, members, and processes illustrated in the drawings, and overlapping description will be appropriately removed. The embodiment does not limit the disclosure, and the embodiment is an example. All features and combinations of the features described in the embodiment may not be necessarily essential for the disclosure.

In the present specification, "a state in which a member A is connected to a member B" includes not only a case in which the member A and the member B are physically and directly connected, but also a case in which the member A and the member B are indirectly connected through another member that does not substantially affect the electrical connection state of the member A and the member B or that does not reduce the functions or the effects attained by the coupling of the member A and the member B.

Similarly, "a state in which a member C is provided between a member A and a member B" includes not only a case in which the member A and the member C or the member B and the member C are directly connected, but also a case in which the member A and the member C or the member B and the member C are indirectly connected through another member that does not substantially affect the electrical connection state of the member A and the member C or the member B and the member C or that does not reduce the functions or the effects attained by the coupling of the member A and the member C or the member B and the member C.

Figure 3:
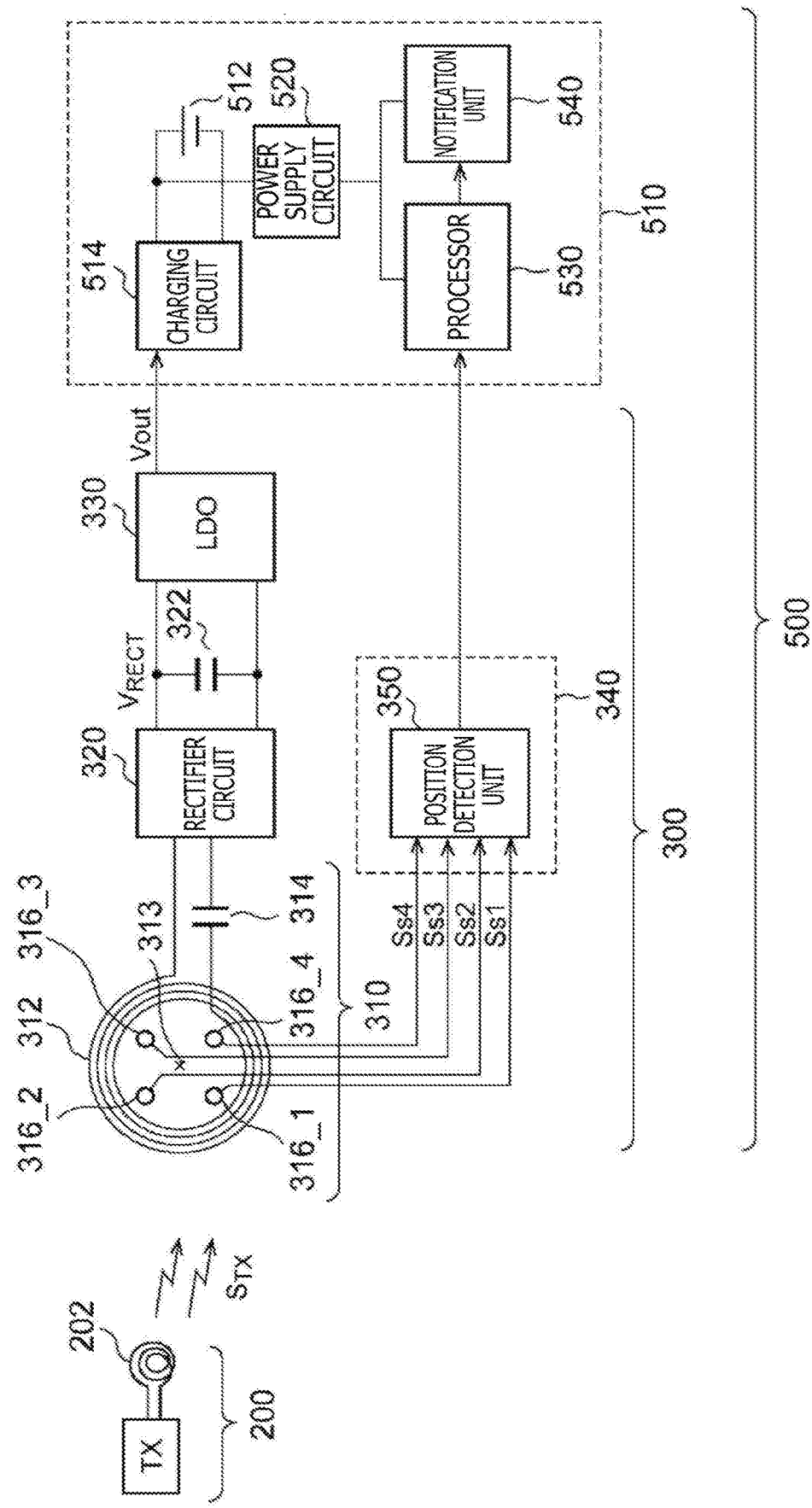
FIG. 3 is a block diagram of a power supply system including an electronic device according to an embodiment.

FIG. 3 is a block diagram of a power supply system 100 including an electronic device 500 according to the embodiment. The power supply system 100 includes a power transmitter 200 (TX) and a power receiver 300 (RX). The power receiver 300 is mounted on the electronic device 500, such as a mobile phone terminal, a smartphone, an audio player, a gaming device, and a tablet terminal.

The power transmitter 200 is mounted on, for example, a charger including a charging stand. The power transmitter 200 includes a transmission antenna 201 and transmits a wireless power signal STX from the transmission antenna 201. The power transmitter 200 and the power receiver 300 are compliant with at least one of the Qi standard and the PMA standard.

The power receiver 300 receives the power signal STX from the power transmitter 200. The power receiver 300 includes a reception antenna 310, a rectifier circuit 320, a power supply circuit 330, and a reception controller 340.

The reception antenna 310 includes a reception coil 312 and a resonant capacitor 314. A capacity value of the resonant capacitor 314 is set to bring a resonant frequency of the reception antenna 310 into line with a frequency fTX of the power signal STX. An induced alternating current (coil current) flows through the reception coil 312 due to components interlinked with the reception coil 312 in a magnetic field of the power signal STX. The rectifier circuit 320 rectifies the coil current and converts the coil current into the DC voltage VRECT. A high-capacity smoothing capacitor 322 smooths the DC voltage VRECT.

The power supply circuit 330 receives the DC voltage VRECT and generates a DC voltage VOUT stabilized at a predetermined voltage level. The power supply circuit 330 supplies the DC voltage VOUT to a load circuit 510.

The load circuit 510 includes a battery 512, a charging circuit 514, a power supply circuit 520, a processor 530, a notification unit 540, and the like. The charging circuit 514 receives the DC voltage VOUT and charges the battery 512. The power supply circuit 520 receives a battery voltage or a voltage generated by the charging circuit 514 and generates one or a plurality of power supply voltages to be supplied to other circuit blocks.

The processor 530 comprehensively controls the electronic device 500. The notification unit 540 is a user interface for presenting information to the user, and examples of the notification unit 540 include a speaker, a display, and a lamp.

The reception antenna 310 further includes N position detection coils 316_1 to 316_N. Although the number N of position detection coils 316 is not particularly limited, two-dimensional position information in an X-direction and a Y-direction can be obtained by nonlinearly arranging three or more position detection coils 316. In the present embodiment, N=4 is set. The plurality of position detection coils 316_1 to 316_N are provided near the reception coil 312 or provided to overlap the reception coil 312.

It is preferable to symmetrically arrange the plurality of position detection coils 316_1 to 316_N at equal distances from a center 313 of the reception coil 312. As a result, misalignment of a transmission coil 202 can be easily detected.

A position detection unit 350 detects a positional relation between the plurality of position detection coils 316_1 to 316_4 and the transmission coil 202 of the wireless power transmitter 200 based on detection signals Ss1 to Ss4 indicating electrical states of the plurality of position detection coils 316_1 to 316_4. The detection signal Ss may be a coil current or a coil voltage. More simply, the position detection unit 350 may be able to determine only whether there is a misalignment of the transmission coil 202.

Figure 4A:
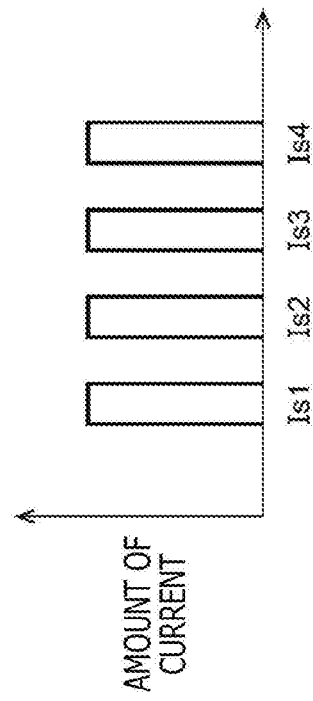
FIGS. 4A and 4B are diagrams describing an operation of the electronic device.
Figure 4B:
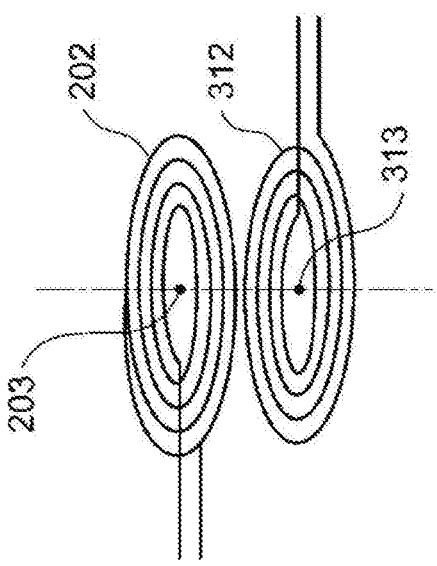

The configuration of the electronic device 500 has been described. Next, an operation of the electronic device 500 will be described with reference to FIGS. 4A and 4B and FIGS. 5A and 5B. FIGS. 4A and 4B are diagrams describing the operation of the electronic device 500. FIGS. 4A and 4B illustrate an ideal state without misalignment of coils. FIG. 4A illustrates a physical positional relation between the transmission coil 202 and the reception coil 312, and centers 203 and 313 of the transmission coil 202 and the reception coil 312 match.

As described above, the plurality of position detection coils 316_1 to 316_N are arranged at equal distances from the center 313 of the reception coil 312. A magnetic field generated by the transmission coil 202 is symmetrical with respect to the center 203 of the transmission coil 202. Therefore, the magnetic field felt by the plurality of position detection coils 316_1 to 316_N is equal in an ideal state like FIG. 4A. Therefore, the detection signals Ss1 to SsN are equal as illustrated in FIG. 4B. That is, it can be estimated that the state is an ideal state without misalignment when the plurality of detection signals Ss1 to SsN are uniform.

Figure 5B:
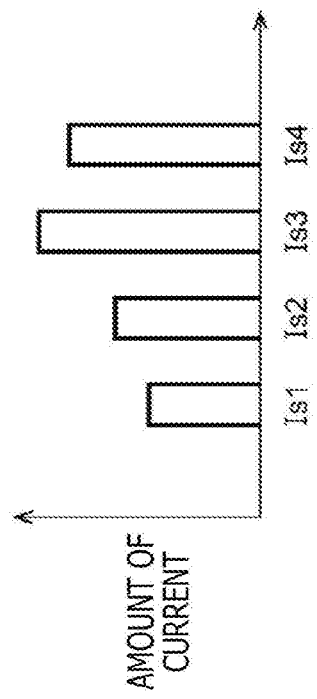
FIGS. 5A and 5B are diagrams describing an operation of the electronic device.
Figure 5A:
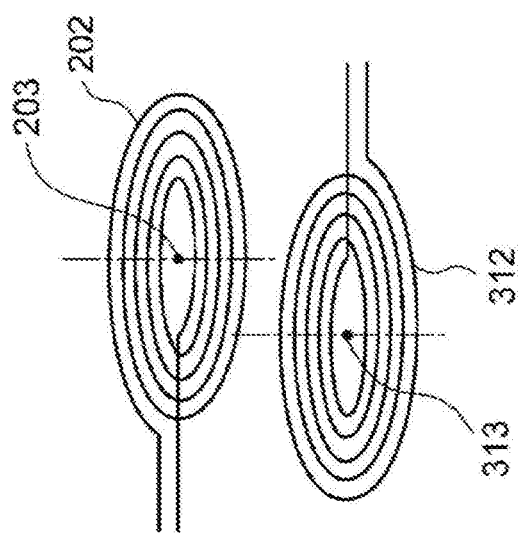

FIGS. 5A and 5B are diagrams describing an operation of the electronic device 500. FIGS. 5A and 5B illustrate a state with a misalignment of coils. When there is a misalignment, the magnetic field felt by the plurality of position detection coils 316_1 to 316_N is non-uniform, and the detection signals Ss1 to SsN are unbalanced. That is, the misalignment can be detected based on the relation between the detection signals Ss1 to Ss4. Note that how the detection signals Ss1 to Ss4 change according to the position of the transmission coil 202 is determined by the shape or the position of each coil, and the relations in FIGS. 4B and 5B are merely examples.

The position detection unit 350 notifies the processor 530 of the presence/absence of the misalignment. The processor 530 can use the notification unit 540 to notify the user of the presence/absence of the misalignment.

The operation of the electronic device 500 has been described. With this electronic device 500, the position of the transmission coil 202 can be estimated based on the relative relation between the detection signals Ss1 to Ss4 of the plurality of position detection coils 316-1 to 316-4. When there is a possibility of misalignment, the charging efficiency can be improved by notifying the user of the possibility of misalignment to prompt the user to correct the position of the electronic device 500.

In the description above, whether there is a misalignment of the transmission coil 202 is detected. In a more advanced manner, the position detection unit 350 may be able to detect coordinates of the transmission coil 202 (for example, coordinates of the center 203 of the transmission coil 202).

For example, in the design stage of the power receiver 300 or the electronic device 500, a set of the detection signals Ss1 to Ss4 may be measured in advance while changing a center position p (x, y) of the transmission coil 202, and the relation between the detection signals Ss1 to Ss4 may be held in a table. Alternatively, calculation formulas (functions) indicating an x-coordinate and a y-coordinate may be derived based on the relation and held in the position detection unit 350.

$x = fx(Ss1, Ss2, Ss3, Ss4)$
$y = fy(Ss1, Ss2, Ss3, Ss4)$

Alternatively, the shape and the number of turns of the transmission coil 202 and the shape and the number of turns of the reception coil 312 can be provided as parameters, and an electromagnetic field simulator can be used to calculate, for each position of the transmission coil 202, an intensity distribution of the magnetic field on an xy-plane generated by the transmission coil 202. Furthermore, the positions and the coil shapes of the plurality of position detection coils 316 can be provided to calculate the current flowing through each position detection coil 316. In this way, the computer simulation can be used to acquire the relation between the position of the transmission coil 202 and the detection signals Ss1 to SsN of the plurality of position detection coils 316.

The table or the arithmetic expression may be held for each type of the power transmitter 200 (or each size of the transmission coil 202).

Next, layouts of the reception antenna 310 will be described with reference to some examples.

Figure 6A:
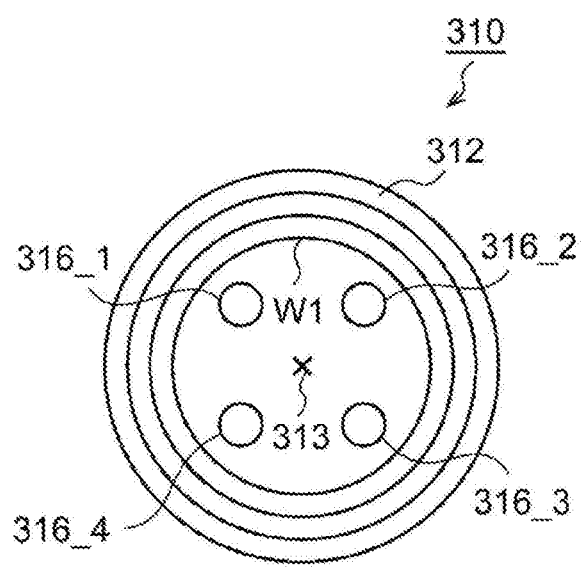
FIGS. 6A, 6B, 6C and 6D are diagrams illustrating layouts of a reception antenna.

FIGS. 6A, 6B, 6C and 6D are diagrams illustrating layouts of the reception antenna 310. In the layout of FIG. 6A, the plurality of position detection coils 316_1 to 316_4 are provided inside of the reception coil 312. The plurality of position detection coils 316_1 to 316_4 are arranged at equal distances from the center 313 and arranged at equal intervals in a circumferential direction. For example, the plurality of position detection coils 316_1 to 316_4 can be provided along a winding W1 at an innermost circumference.

Figure 6B:
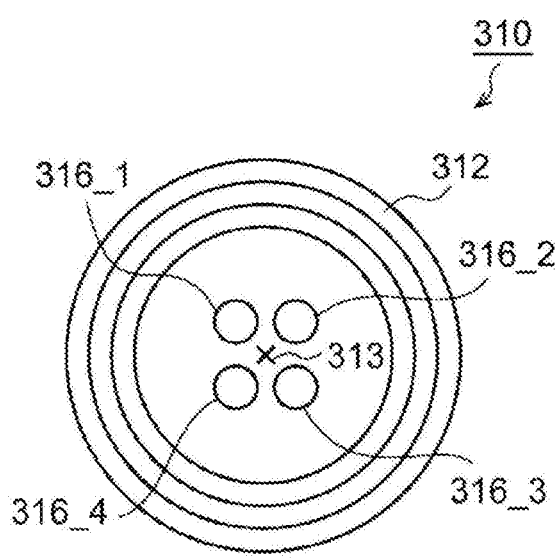

In the layout of FIG. 6B, the plurality of position detection coils 316_1 to 316_4 are provided inside of the reception coil 312 as in FIG. 6A. The plurality of position detection coils 316_1 to 316_4 are concentrated at the center 313.

Figure 6C:
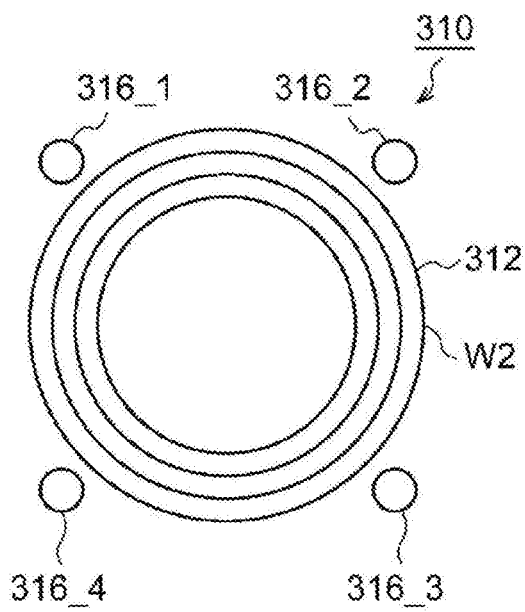

In the layout of FIG. 6C, the plurality of position detection coils 316_1 to 316_4 are provided outside of the reception coil 312. For example, the plurality of position detection coils 316_1 to 316_4 can be provided along a winding W2 at an outermost circumference of the reception coil 312.

Figure 6D:
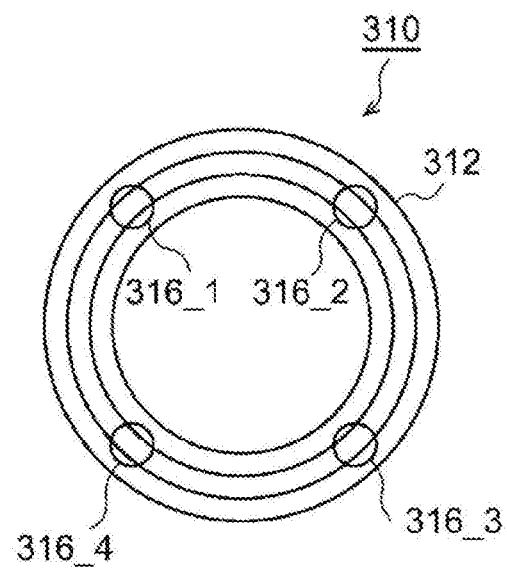

In the layout of FIG. 6D, the plurality of position detection coils 316_1 to 316_4 are arranged to overlap the reception coil 312.

Next, a configuration example of the position detection unit 350 will be described. FIG. 7 is a circuit diagram illustrating a configuration example of the position detection unit 350. The position detection unit 350 includes a plurality of amplitude detection circuits 352_1 to 352_N corresponding to the plurality of position detection coils 316_1 to 316_N. Each amplitude detection circuit 352_i (i=1, 2, . . . N) generates an amplitude signal Asi indicating an amplitude of the detection signal Ssi of the corresponding position detection coil 316_i. The amplitude signal Asi represents a strength of magnetic field components of a power signal entering the corresponding position detection coil 316_i. An analog/digital (A/D) converter 354_i converts the amplitude signal Asi into a digital signal Dsi.

An arithmetic processing unit 360 detects the position of the transmission coil 202 based on a plurality of digital signals Ds1 to DsN. Note that the function of the arithmetic processing unit 360 may be implemented in the processor 530.

Figure 8:
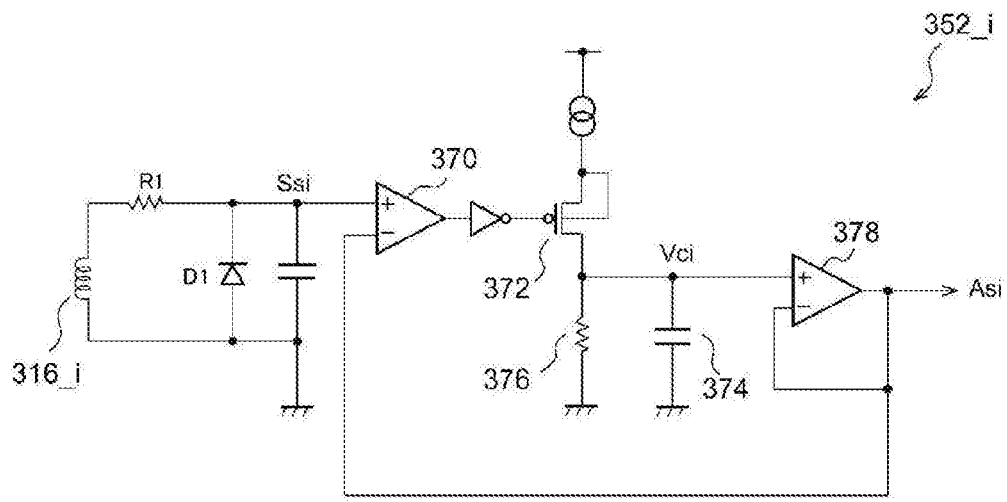
FIG. 8 is a circuit diagram illustrating a configuration example of an amplitude detection circuit.

FIG. 8 is a circuit diagram illustrating a configuration example of the amplitude detection circuit 352_i. A diode D1 rectifies the current flowing through the position detection coil 316_i (or the voltage generated by the position detection coil 316_0. A limiting resistance R1 for circuit protection is provided between the position detection coil 316_i and the diode D1. The amplitude detection circuit 352 includes a peak hold circuit. Specifically, a comparator 370 compares the amplitude signal Asi as an output of the amplitude detection circuit 352 with the detection signal Ssi as an input of the amplitude detection circuit 352. If Asi>Ssi, a transistor 372 is turned on to charge a capacitor 374. A voltage of the capacitor 374 is slowly discharged through a resistance 376. A resistance value of the resistance 376 defines a time constant of peak hold. The voltage corresponding to the amplitude (that is, the peak) of the detection signal Ssi is generated in the capacitor 374. A voltage Vci of the capacitor 374 is output through a buffer 378 of a final stage.

Note that the configuration of the amplitude detection circuit 352 is not limited to the configuration of FIG. 8, and various well-known circuits can be used.

The electronic device 500 can use a display or sound to report the misalignment of the reception antenna 310 to the user of the electronic device 500.

Figure 9:
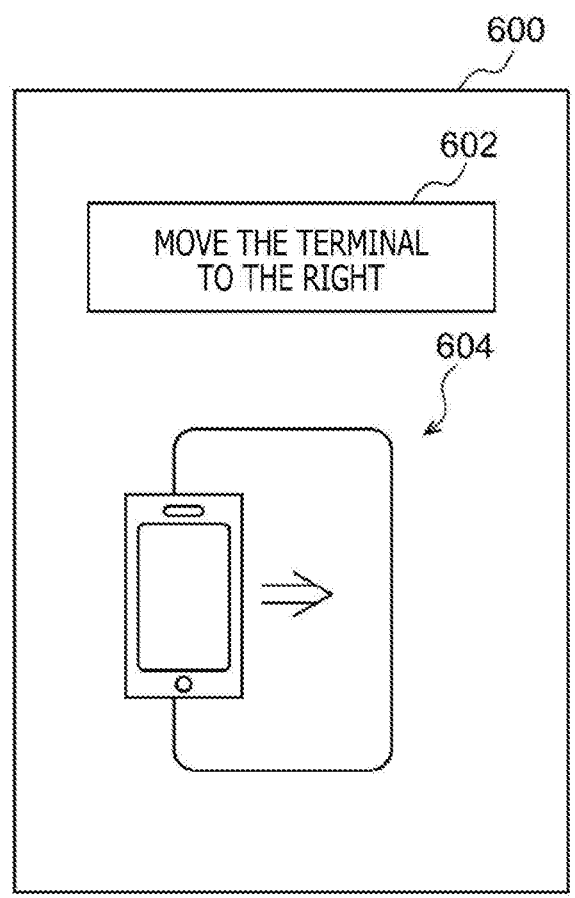
FIG. 9 is a diagram illustrating a display of the electronic device.

FIG. 9 is a diagram illustrating a display 600 of the electronic device 500. The display 600 is an example of the notification unit 540. Once the processor 530 detects the misalignment of the coil, the processor 530 displays, on the display 600, a message 602 for prompting to correct the misalignment. In this case, a buzzer or a voice message may be reproduced.

In a case where the position detection unit 350 can detect a direction of the misalignment of the transmission coil 202, the message 602 can include information of a direction in which the terminal should move.

In addition to or in place of the message 602, an image 604 for prompting to correct the misalignment may be displayed on the display 600. In a case where the position detection unit 350 can detect the relative positional relation between the reception antenna 310 and the transmission coil 202, in other words, in a case where the positional relation between the charging stand and the terminal can be detected, the detected positional relation may be reflected on the charging stand and the terminal in the image 604.

Although specific terms are used to describe the present disclosure based on the embodiment, the embodiment merely illustrates the principle and the application of the present disclosure, and a large number of modifications and changes in arrangement can be made to the embodiment without departing from the scope of the present disclosure described in the claims.

The present disclosure contains subject matter related to that disclosed in Japanese Priority Patent Application JP 2019-065945 filed in the Japan Patent Office on Mar. 29, 2019, the entire content of which is hereby incorporated by reference.

What is claimed is:
1. A wireless power receiver, comprising:
   a reception antenna including a reception coil configured to receive a power signal from a wireless power transmitter;
   a rectifier circuit configured to rectify a current of the reception antenna;
   a plurality of position detection coils provided within proximity of the reception coil or provided to overlap the reception coil, wherein each position detection coil of the plurality of position detection coils is configured to generate a detection signal, and
the detection signal indicates an electrical state of a corresponding position detection coil of the plurality of position detection coils; and
a position detection unit that includes a plurality of amplitude detection circuits, wherein
each amplitude detection circuit of the plurality of amplitude detection circuits corresponds to a respective position detection coil of the plurality of position detection coils,
each amplitude detection circuit of the plurality of amplitude detection circuits includes a peak hold circuit,
each amplitude detection circuit of the plurality of amplitude detection circuits is configured to detect an amplitude of the detection signal of the respective position detection coil, and
the position detection unit is configured to detect a positional relation between the plurality of position detection coils and a transmission coil of the wireless power transmitter based on the detected amplitude of the detection signal of each position detection coil of the plurality of position detection coils.

2. The wireless power receiver according to claim 1, wherein the reception coil includes the plurality of position detection coils.

3. The wireless power receiver according to claim 2, wherein the plurality of position detection coils are provided along a winding at an innermost circumference of the reception coil.

4. The wireless power receiver according to claim 1, wherein the plurality of position detection coils are provided outside of the reception coil.

5. The wireless power receiver according to claim 4, wherein the plurality of position detection coils are provided along a winding at an outermost circumference of the reception coil.

6. The wireless power receiver according to claim 1, wherein a number of the plurality of position detection coils is three or more.

7. The wireless power receiver according to claim 1, wherein the plurality of position detection coils is arranged symmetrical with respect to a center of the reception coil.

8. The wireless power receiver according to claim 1, wherein
the reception coil is a circular coil, and
a number of the plurality of position detection coils is four, and the plurality of position detection coils is evenly arranged in a circumferential direction of the reception coil.

9. The wireless power receiver according to claim 1, wherein
the position detection unit includes an arithmetic processing unit, and
the arithmetic processing unit is configured to detect a position of the transmission coil based on an output of the plurality of amplitude detection circuits.

10. The wireless power receiver according to claim 1, wherein the wireless power receiver is compliant with at least one of a Qi standard and a Power Matters Alliance standard.

11. An electronic device, comprising:
a wireless power receiver configured to receive a power signal from a wireless power transmitter, the wireless power receiver including:
a reception antenna including a reception coil;
a rectifier circuit configured to rectify a current of the reception antenna;
a plurality of position detection coils provided within proximity of the reception coil or provided to overlap the reception coil, wherein
each position detection coil of the plurality of position detection coils is configured to generate a detection signal, and
the detection signal indicates an electrical state of a corresponding position detection coil of the plurality of position detection coils; and
a position detection unit that includes a plurality of amplitude detection circuits, wherein
each amplitude detection circuit of the plurality of amplitude detection circuits corresponds to a respective position detection coil of the plurality of position detection coils,
each amplitude detection circuit of the plurality of amplitude detection circuits includes a peak hold circuit,
each amplitude detection circuit of the plurality of amplitude detection circuits is configured to detect an amplitude of the detection signal of the respective position detection coil, and
the position detection unit is configured to detect a positional relation between the plurality of position detection coils and a transmission coil of the wireless power transmitter based on the detected amplitude of the detection signal of each position detection coil of the plurality of position detection coils.

12. The electronic device according to claim 11, further comprising a notification unit configured to at least one of:
notify a user of the electronic device of misalignment between a position of the electronic device and that of the transmission coil, or
prompt the user of the electronic device to move the position of the electronic device, wherein the user is prompted based on position information of the transmission coil detected by the wireless power receiver.

13. An electronic device, comprising:
a wireless power receiver configured to receive a power signal from a wireless power transmitter, wherein the wireless power receiver includes:
a plurality of position detection coils, wherein
each position detection coil of the plurality of position detection coils is configured to generate a detection signal, and
the detection signal indicates an electrical state of a corresponding position detection coil of the plurality of position detection coils; and
a position detection unit that includes a plurality of amplitude detection circuits corresponding to the plurality of position detection coils, wherein
each amplitude detection circuit of the plurality of amplitude detection circuits corresponds to a respective position detection coil of the plurality of position detection coils,
each amplitude detection circuit of the plurality of amplitude detection circuits includes a peak hold circuit,
each amplitude detection circuit of the plurality of amplitude detection circuits is configured to detect an amplitude of the detection signal of the respective position detection coil, and the position detection unit is configured to detect a position of a transmission coil of the wireless power transmitter based on the detected amplitude of the detection signal of each position detection coil of the plurality of position detection coils; and
a notification unit configured to notify a user of information based on the position of the transmission coil detected by the wireless power receiver.

* * * * *